(12) United States Patent
Small et al.

(10) Patent No.: US 9,692,500 B2
(45) Date of Patent: *Jun. 27, 2017

(54) AIRCRAFT COMMUNICATIONS DURING DIFFERENT PHASES OF FLIGHT

(71) Applicant: The Boeing Company, Chicago, IL (US)

(72) Inventors: Gregory J. Small, Federal Way, WA (US); Timothy M. Mitchell, Seattle, WA (US); Duke McMillin, Vashon, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,044

(22) Filed: Aug. 2, 2016

(65) Prior Publication Data

US 2016/0365917 A1 Dec. 15, 2016

Related U.S. Application Data

(63) Continuation of application No. 12/507,509, filed on Jul. 22, 2009, now Pat. No. 9,426,768.

(51) Int. Cl.
*H04W 64/00* (2009.01)
*H04B 7/185* (2006.01)

(52) U.S. Cl.
CPC ........ *H04B 7/18506* (2013.01); *H04W 64/00* (2013.01)

(58) Field of Classification Search
USPC ......... 455/404.2, 414.1, 414.2, 414.3, 414.4, 455/431, 430, 428, 429, 436, 456.1, 11.1, 455/13.1, 13.3, 25; 370/331, 255, 256, 370/311, 312
See application file for complete search history.

(56) References Cited

U.S. PATENT DOCUMENTS

| | | | | |
|---|---|---|---|---|
| 5,987,011 A | * | 11/1999 | Toh | H04W 40/10 370/255 |
| 6,044,062 A | * | 3/2000 | Brownrigg | H04L 29/06 370/238 |
| 7,313,362 B1 | * | 12/2007 | Sainct | B64D 5/00 244/158.4 |
| 7,561,802 B2 | * | 7/2009 | Krill | H04B 10/118 398/121 |

(Continued)

*Primary Examiner* — Ping Hsieh
(74) *Attorney, Agent, or Firm* — Yee & Associates, P.C.

(57) ABSTRACT

A method and apparatus for exchanging information between a source and an aircraft. In response to a request to exchange the information between the aircraft and the source, a number of aircraft is identified to send microwave signals between the source and the aircraft to form a number of identified aircraft based on a location of the aircraft and a location of the source. The number of identified aircraft is configured to send the microwave signals between the source and the aircraft to form a number of configured aircraft. The number of configured aircraft forms a mobile network. The microwave signals are sent between the source and the aircraft using the number of configured aircraft. The information is exchanged between the aircraft and the source using the microwave signals sent through the mobile network.

26 Claims, 8 Drawing Sheets

(56) References Cited

U.S. PATENT DOCUMENTS

| | | | | |
|---|---|---|---|---|
| 2002/0142717 | A1* | 10/2002 | Morimoto | H04W 8/005 455/11.1 |
| 2003/0203734 | A1* | 10/2003 | Igloi | G06F 8/60 455/431 |
| 2004/0158863 | A1* | 8/2004 | McLain | H04B 7/18506 725/73 |
| 2004/0219878 | A1* | 11/2004 | Raji | H04W 40/02 455/11.1 |
| 2006/0063529 | A1* | 3/2006 | Seligsohn | B64B 1/44 455/431 |
| 2007/0184846 | A1* | 8/2007 | Horton, Jr. | G08G 5/0013 455/456.1 |
| 2009/0023458 | A1* | 1/2009 | Mountney | H04W 16/14 455/456.1 |

* cited by examiner

US 9,692,500 B2

AIRCRAFT COMMUNICATIONS DURING DIFFERENT PHASES OF FLIGHT

BACKGROUND INFORMATION

1. Field

The present disclosure relates generally to aircraft communications and, in particular, to a method and apparatus for exchanging information between a number of aircraft and/or devices remote to the aircraft. Still more particularly, the present disclosure relates to a method and apparatus for exchanging information between a number of aircraft and/or devices remote to the aircraft using different types of communications links.

2. Background

Computer systems on aircraft and computer systems located remotely to aircraft often exchange information with each other. The exchange of information between aircraft computer systems and computer systems remote to the aircraft may be performed periodically, continuously, or in response to events.

The exchange of information between computer systems on an aircraft and computer systems located remotely to the aircraft may include messages used to analyze the aircraft. This exchange of information may occur during a phase of flight such as, for example, in flight, on ground, take off, landing, climbing, cruising, and/or some other phase of flight. For example, information in the form of data may be downloaded from the aircraft to the remote data processing system. This data may be used to analyze engine performance, aircraft performance, operational conditions, and other suitable information.

Further, some airlines offer passengers a capability to use devices that employ wireless communications in the cabin during flight. For example, passengers may use laptops, phones, and other suitable devices to access the Internet, make voice calls, and/or other suitable operations.

Providing wireless communications for these and other types of uses may be challenging. Wireless communications may include microwave signals, radio frequency signals, and/or other forms of communications. For example, with currently available ground-based wireless signal systems, the amount of data that may be transferred between an aircraft and remote computers or devices may be limited. Ground-based wireless communications systems provide limited distances over which communications may be established. The use of satellite-based communications may provide greater bandwidth and speed. These types of systems, however, are typically more costly.

Therefore, it would be advantageous to have a wireless communications method and apparatus that takes into account one or more of the issues discussed above, as well as possibly other issues.

SUMMARY

In one advantageous embodiment, a method is present for exchanging information between a source and an aircraft. In response to a request to exchange the information between the aircraft and the source, a number of aircraft is identified to send microwave signals between the source and the aircraft to form a number of identified aircraft based on a location of the aircraft and a location of the source. The number of identified aircraft is configured to send microwave signals between the source and the aircraft to form a number of configured aircraft. The number of configured aircraft forms a mobile network. The microwave signals are sent between the source and the aircraft using the number of configured aircraft. The information is exchanged between the aircraft and the source using the microwave signals sent through the mobile network.

In another advantageous embodiment, a method is present for providing communications. An antenna in a plurality of antennas associated with a source is identified based on a location of an aircraft within a plurality of aircraft approaching the source and having a selected phase of flight and a location of the antenna in response to a request to provide the communications between the source and the aircraft. The antenna is configured to send microwave signals between the source and the aircraft to form a configured antenna. The microwave signals are sent between the source and the aircraft using the configured antenna. The microwave signals provide the communications.

In another advantageous embodiment, an apparatus comprises an aircraft and a number of directional antennas associated with the aircraft. The number of directional antennas is capable of being configured to exchange microwave signals with a source using a number of identified aircraft that form a mobile network in response to a request to exchange information between the source and the aircraft. The number of identified aircraft in the mobile network is selected based on a location of the aircraft and a location of the source.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
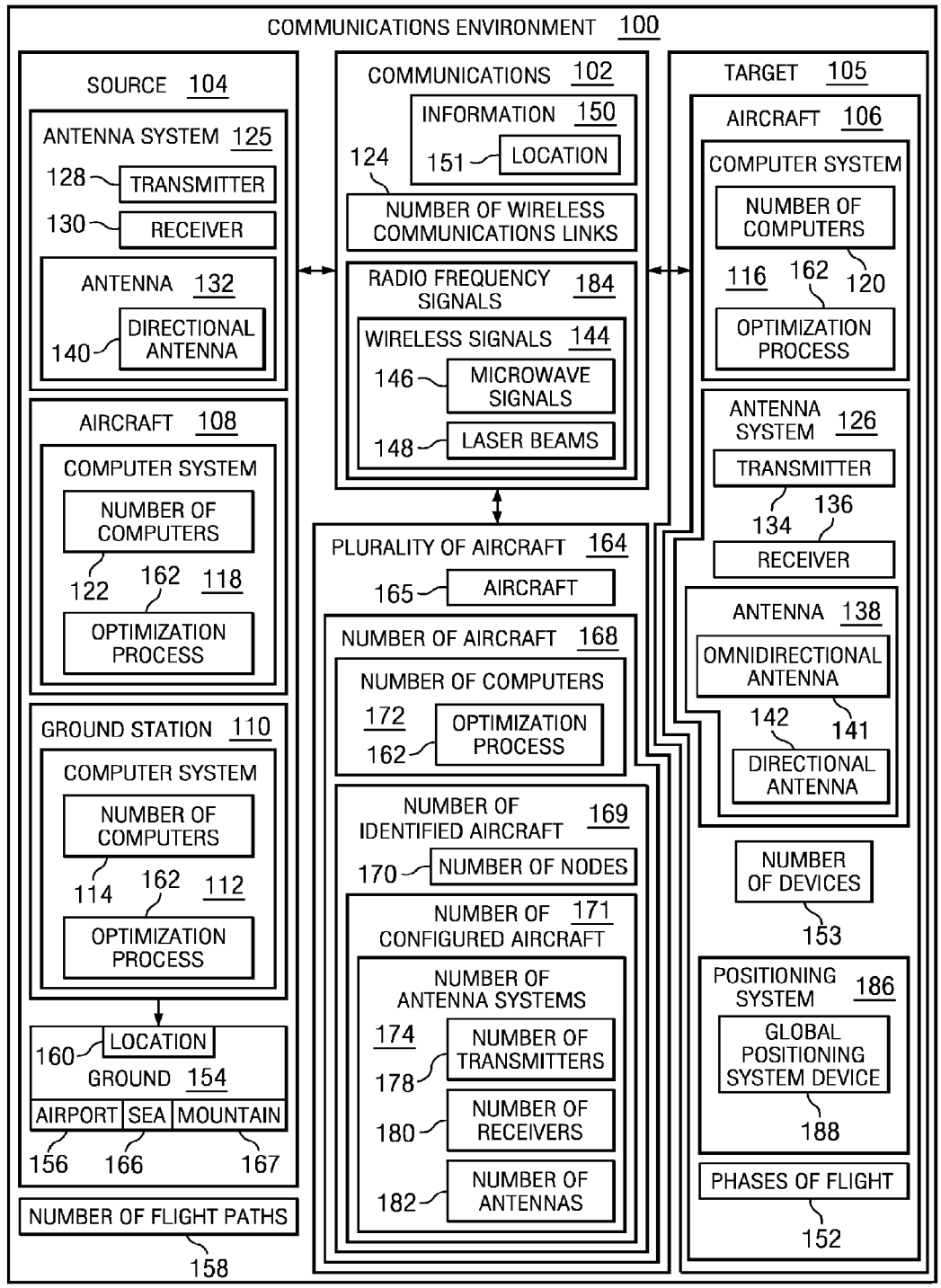
FIG. 1 is a diagram of a communications environment in accordance with an advantageous embodiment.

With reference now to the figures and, in particular, with reference to FIG. 1, a diagram of a communications environment is depicted in accordance with an advantageous embodiment. Communications environment 100 is an example of an environment in which communications 102 may be provided between source 104 and target 105. Source 104 may take various forms. For example, source 104 may be at least one of aircraft 108 and ground station 110. In these illustrative examples, an aircraft may be a fixed-wing aircraft, a rotor-wing aircraft, or any other vehicle capable of flight. In some examples, source 104 may take the form of a missile or a submersible vehicle.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Ground station 110 may include computer system 112, which may contain number of computers 114. In some advantageous embodiments, computer system 112 may function as a routing system to route information to a location remote to ground station 110. Further, in these illustrative examples, aircraft 106 includes computer system 116, and aircraft 108 includes computer system 118. Computer system 116 has number of computers 120, and computer system 118 has number of computers 122. A number, as used herein with reference to items, refers to one or more items. For example, number of computers 122 is one or more computers. In these examples, computer systems 112, 116, and 118 may execute optimization process 162.

In these illustrative examples, communications 102 may be established between source 104 and aircraft 106 during phases of flight 152 for aircraft 106. Phases of flight 152 may include, for example, in flight, on ground, take off, landing, climbing, cruising, and/or other suitable phases of flight.

Communications 102 is established using number of wireless communications links 124. Number of wireless communications links 124 is established in these illustrative examples by the execution of optimization process 162. In these illustrative examples, optimization process 162 may be implemented using a currently available optimization process such as, for example, without limitation, AirSync, which is available from Proximetry, Inc. Optimization process 162 uses antenna system 125 associated with source 104 and antenna system 126 associated with aircraft 106 to form number of wireless communications links 124.

In this illustrative example, antenna system 125 associated with source 104 includes transmitter 128, receiver 130, and antenna 132. Antenna system 126 associated with aircraft 106 includes transmitter 134, receiver 136, and antenna 138. In the different illustrative examples, antenna 132 takes the form of directional antenna 140, and antenna 138 takes the form of omnidirectional antenna 141 or directional antenna 142.

Antenna 132 and antenna 138 may be configured by optimization process 162 to transmit and/or receive wireless signals 144 to provide communications 102. For example, without limitation, the configuration of antenna 132 and antenna 138 may include positioning the antennas and tuning the antennas to a number of frequencies. The antennas may be positioned by electrically and/or mechanically steering the antennas using optimization process 162. Further, optimization process 162 may configure antenna 132 and antenna 138 to increase bandwidth and increase throughput for number of wireless communications links 124.

In other advantageous embodiments, at least one of antenna 132 and antenna 138 may transmit wireless signals 144 in the desired direction. For example, a phased array may be used for directional antennas 140 and 142 to emit radiation patterns for wireless signals 144 in the desired direction. With this type of implementation, physical movement of the antenna may not be needed.

In the different illustrative examples, wireless signals 144 take the form of microwave signals 146. Microwave signals 146 may be, for example, electromagnetic waves having a wavelength from around one millimeter to around one meter and a frequency from around 0.3 gigahertz to around 300 gigahertz. Of course, wireless signals 144 also may take other forms. In other advantageous embodiments, wireless signals 144 may take the form of laser beams 148 or radio frequency signals 184.

Further, number of wireless communications links 124 may be formed using wireless signals 144. In these examples, wireless signals 144 may be sent using a technology, such as Worldwide Interoperability for Microwave Access (WiMax), which is based on the IEEE 802.16 standard. The Worldwide Interoperability for Microwave Access technology provides multiple frequency bands for communications, a bandwidth of around and greater than around 50 megabits per second, and a signal range of up to around 31 miles for mobile users. One example of a mobile user may be an aircraft in flight.

For example, antenna system 126 on aircraft 106 may be configured to provide communications 102 using the Worldwide Interoperability for Microwave Access technology to form number of wireless communications links 124 using wireless signals 144. Still further, antenna system 125 may be configured using this technology to communicate with aircraft 106.

In these illustrative examples, communications 102 between source 104 and aircraft 106 may contain information 150. Information 150 may be, for example, without limitation, at least one of data, log files, programs, messages, commands, and/or other suitable types of information. Further, information 150 may be either analog or digital information.

The exchange of information 150 between source 104 and aircraft 106 may include, for example, exchanging information between computer system 112 and computer system 116 in aircraft 106, exchanging information between computer system 118 and computer system 116, and/or exchanging information 150 between source 104 and number of devices 153 in a passenger cabin within aircraft 106. This exchange of information may be in one direction or in both directions with respect to these devices, computers, and/or computer systems. Number of devices 153 may include, for example, without limitation, a computer, a mobile phone, a gaming device, or some other suitable type of device capable of exchanging information 150.

Communications 102 may be provided to aircraft 106 in a number of different ways in the illustrative embodiments. For example, communications 102 may be provided when source 104 takes the form of ground station 110 by placing ground station 110 on ground 154 around airport 156. In this manner, ground station 110 may provide communications 102 to aircraft 106 during phases of flight 152 that occur near airport 156.

In these illustrative examples, ground station 110 may be positioned on ground 154 based on number of flight paths 158. The selection of location 160 for ground station 110 on ground 154 around airport 156 may be selected to maximize or increase the bandwidth and/or distance over which communications 102 may be provided to aircraft 106 using number of flight paths 158.

In other advantageous embodiments, source 104 may take the form of ground station 110 located at location 160 on ground 154 at a location other than around airport 156. For example, location 160 may be on or around sea 166, mountain 167, or some other suitable location for location 160. Location 160 may be selected based on number of flight paths 158.

Additionally, optimization process 162 is executed to configure antenna system 125 to increase the distance and/or bandwidth over which communications 102 is provided between source 104 and aircraft 106. Further, optimization process 162 is executed to provide communications 102 between aircraft, such as aircraft 165 within plurality of aircraft 164 and aircraft 106.

In these illustrative examples, location 151 of aircraft 106 may be identified based on information 150 sent to optimization process 162 through wireless signals 144. Location 151 of aircraft 106 may be identified using positioning system 186 located in aircraft 106. Positioning system 186 may be, for example, global positioning system device 188.

In these illustrative examples, source 104 and/or aircraft 106 may send a request for providing communications 102 between source 104 and aircraft 106. Optimization process 162 may be executed to provide communications 102 between source 104 and aircraft 106 using number of aircraft 168 based on location 151 of aircraft 106 and location 160 of source 104. For example, number of aircraft 168 may have number of computers 172 executing optimization process 162. Source 104, aircraft 106, and number of aircraft 168 may execute optimization process 162 to identify number of identified aircraft 169 from number of aircraft 168 based on location 151 of aircraft 106 and location 160 of source 104. These identified aircraft may be used to provide communications 102 between, for example, ground station 110 and aircraft 106.

Number of identified aircraft 169 may be configured to form number of configured aircraft 171 using optimization process 162. Number of configured aircraft 171 sends wireless signals 144 between ground station 110 and aircraft 106 using optimization process 162. In this illustrative example, number of configured aircraft 171 forms mobile network 173 and functions as number of nodes 170 within mobile network 173 for providing communications 102. Further, number of configured aircraft 171 may have number of antenna systems 174 for use in providing communications 102. Number of antenna systems 174 may include number of transmitters 178, number of receivers 180, and number of antennas 182.

In these examples, number of antenna systems 174, antenna system 125 for source 104, and antenna system 126 for aircraft 106 may be configured using optimization process 162 to provide communications 102. Optimization process 162 may use at least one of a maximum bandwidth, a maximum throughput, a least number of aircraft 168 sending wireless signals 144, a minimum distance between number of aircraft 168, a minimum distance between number of aircraft 168 and aircraft 106, a minimum distance between source 104 and aircraft 106, and information about aircraft 106 and number of aircraft 168 to configure antenna system 125, antenna system 126, and number of antenna systems 174 and to provide communications 102. These different antenna systems are configured to form a number of configured antennas.

Information about aircraft 106 and number of aircraft 168 may include at least one of a location, a speed, a heading, a time, an altitude, a flight path, a phase of flight, and a range of frequencies.

In this manner, optimization process 162 may be executed by source 104, aircraft 106, and/or plurality of aircraft 164 to provide communications 102 between source 104 and aircraft 106.

Figure 2:
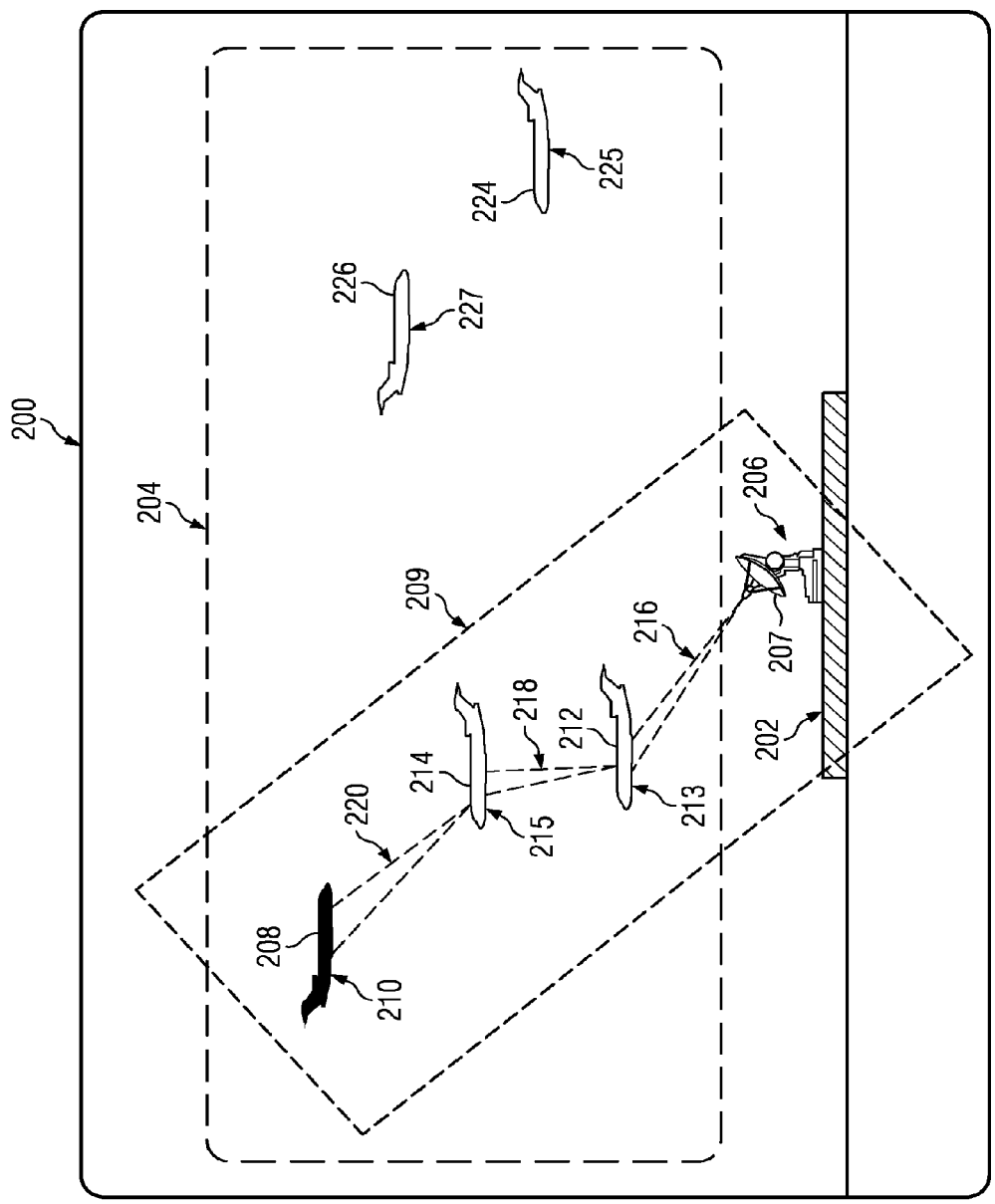
FIG. 2 is an illustration of communications between a number of aircraft and a ground station in accordance with an advantageous embodiment.

With reference now to FIG. 2, an illustration of communications between a number of aircraft and a ground station is depicted in accordance with an advantageous embodiment. In this illustrative example, communications environment 200 is an example of one implementation of communications environment 100 in FIG. 1. Communications environment 200 comprises ground station 202 and number of aircraft 204.

In this depicted example, ground station 202 communicates with number of aircraft 204 using an optimization process, such as optimization process 162 in FIG. 1. Ground station 202 has antenna system 206. Antenna system 206 is configured to exchange information with number of aircraft 204. In these examples, antenna system 206 may comprise antenna 207 for both transmitting and receiving information to and from number of aircraft 204.

At some point in time, ground station 202 may exchange information with aircraft 208 using selected aircraft from number of aircraft 204. In this illustrative example, location 210 of aircraft 208 may be at a location at which aircraft 208 is unable to receive and/or transmit wireless signals to and/or from ground station 202. For example, aircraft 208 may be at a distance out of the range for the wireless signals, a location out of the line of sight from ground station 202, and/or some other location at which aircraft 208 may not directly communicate with ground station 202.

Ground station 202 identifies location 210 of aircraft 208 in this example. Using location 210 of aircraft 208, ground station 202 identifies aircraft within number of aircraft 204 to provide communications between ground station 202 and aircraft 208. In this illustrative example, ground station 202 uses optimization process 162 in FIG. 1 to identify aircraft within number of aircraft 204 to provide the communications.

As depicted in this example, optimization process 162 identifies aircraft 212 at location 213 and aircraft 214 at location 215 within number of aircraft 204. These aircraft are examples of number of identified aircraft 169 in FIG. 1 and may be configured to form number of configured aircraft 171 in FIG. 1. Further, this number of identified aircraft may have a first number of antennas on the aircraft.

These configured aircraft, aircraft 212 and aircraft 214, may form mobile network 209 and may be used to provide communications between ground station 202 and aircraft 208. Mobile network 209 is a network that is continuously reconfigured using optimization process 162 to provide communications between ground station 202 and aircraft 208. Optimization process 162 is used with mobile network 209 to provide communications with at least one of maximum throughput, maximum bandwidth, load balancing, and a minimum distance for communications between the nodes of mobile network 209, aircraft 208, and antenna system 206. Antenna system 206 is configured to provide communications based on location 213 of aircraft 212 in this example.

Antenna system 206 may be configured using optimization process 162 for use with mobile network 209. For example, antenna system 206 may be configured based on location 213 of aircraft 212. Antenna 207 may be positioned in a direction towards the aircraft for which communications are desired. For example, antenna 207 may be positioned by electrically and/or mechanically steering antenna 207 towards location 213 of aircraft 212. In other advantageous embodiments, antenna 207 may be an omnidirectional antenna that does not require steering. In other words, when antenna 207 is an omnidirectional antenna, antenna 207 may provide substantially equivalent communications in all directions for antenna 207. Further, antenna system 206 may be configured by tuning antenna 207 to a frequency associated with aircraft 212.

Ground station 202 sends wireless signals 216 to aircraft 212 using antenna system 206. Aircraft 212 may be configured using optimization process 162 in FIG. 1 to be a first configured aircraft in mobile network 209. Optimization process 162 may be used to configure an antenna system on aircraft 212 to send wireless signals 218 to aircraft 214. Aircraft 214 also may be configured using optimization process 162 to be a second configured aircraft in mobile network 209. Optimization process 162 is used to configure an antenna system on aircraft 214 to transmit wireless signals 220 to aircraft 208. In this manner, information may be indirectly sent between ground station 202 and aircraft 208. Further, while aircraft 212 and aircraft 214 are part of mobile network 209, the first number of antennas on these aircraft may be continuously reconfigured using optimization process 162.

In these illustrative examples, number of aircraft 204 also may include aircraft 224 at location 225 and aircraft 226 at location 227.

Figure 3:
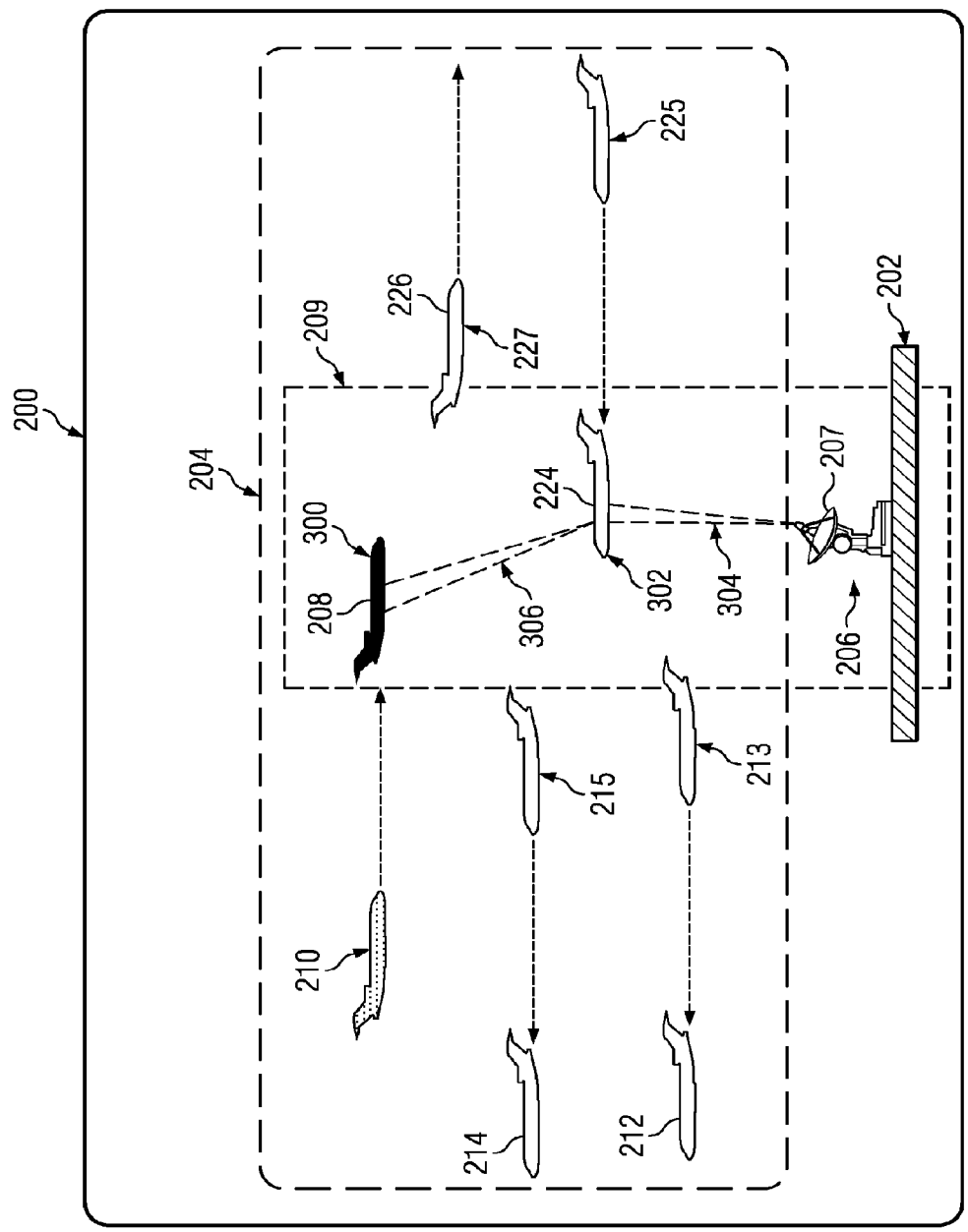
FIG. 3 is an illustration of communications between a ground station and an aircraft in accordance with an advantageous embodiment.

With reference now to FIG. 3, an illustration of communications between a ground station and an aircraft is depicted in accordance with an advantageous embodiment. In this illustrative example, the location of aircraft 208 changes during flight. As the location of aircraft 208 changes, mobile network 209 provides communications between aircraft 208 and ground station 202. Antenna system 206, aircraft 208, and mobile network 209 may be continuously reconfigured or reconfigured as needed to maintain communications between aircraft 208 and ground station 202. For example, antenna system 206 may be continuously reconfigured using optimization process 162 in FIG. 1.

As depicted, aircraft 208 moves to location 300. Based on this updated location of aircraft 208 and the updated locations of the other aircraft within number of aircraft 204, optimization process 162 identifies an updated number of aircraft within number of aircraft 204 to form an updated number of identified aircraft for use in providing communications with aircraft 208. The updated number of identified aircraft is configured using optimization process 162 to form an updated number of configured aircraft for providing communications. Further, the updated number of identified aircraft has a second number of antennas that are configured for communications using optimization process 162.

For example, at location 300 of aircraft 208, optimization process 162 identifies aircraft 224 at location 302 to communicate with aircraft 208. Aircraft 224 may be reconfigured using optimization process 162 to provide communications with aircraft 208. In this manner, mobile network 209 is reconfigured to include aircraft 208, antenna system 206, and aircraft 224.

Further, in this illustrative example, antenna system 206 is reconfigured using optimization process 162 to send wireless signals to aircraft 224. For example, antenna system 206 is switched from a first frequency for aircraft 212 to a second frequency for aircraft 224. In this manner, antenna system 206 is reconfigured to provide communications with aircraft 208 using an updated number of configured aircraft, which includes aircraft 224.

In this illustrative example, ground station 202 sends wireless signals 304 to aircraft 224 at location 302. In turn, aircraft 224 sends wireless signals 306 to aircraft 208 at location 300.

As depicted in this illustrative example, mobile network 209 is reconfigured using optimization process 162 to decrease the number of nodes within network 209. This reconfiguration occurs to provide communications between aircraft 208 and ground station 202 in a manner that maximizes bandwidth and maximizes throughput. Further, communications are provided between ground station 202 and aircraft 208 with a minimum distance for the wireless signals between the nodes in mobile network 209 and between ground station 202 and aircraft 208.

In this manner, mobile network 209 is continuously updated by reconfiguring the number of nodes within network 209 using an optimization process. In these illustrative examples, mobile network 209 provides simultaneous communications between the nodes within mobile network 209 by using a number of frequencies based on a number of unique identifiers for the different nodes. Of course, in some advantageous embodiments, mobile network 209 may only be reconfigured as needed to maintain communications between ground station 202 and aircraft 208.

In the different advantageous embodiments, the reconfiguration of mobile network 209, antenna system 206, and aircraft 208 and the different antenna systems may be performed in a manner that reduces and/or avoids a loss in communications. In other words, for example, the use of a different aircraft as a node for mobile network 209 may occur without a break in providing communications between ground station 202 and aircraft 208.

In other advantageous embodiments, aircraft 208 at location 300 sends wireless signals to aircraft 224. In turn, aircraft 224 may send wireless signals to ground station 202. Thus, communications between aircraft 208 and ground station 202 may be bidirectional or unidirectional.

Figure 4:
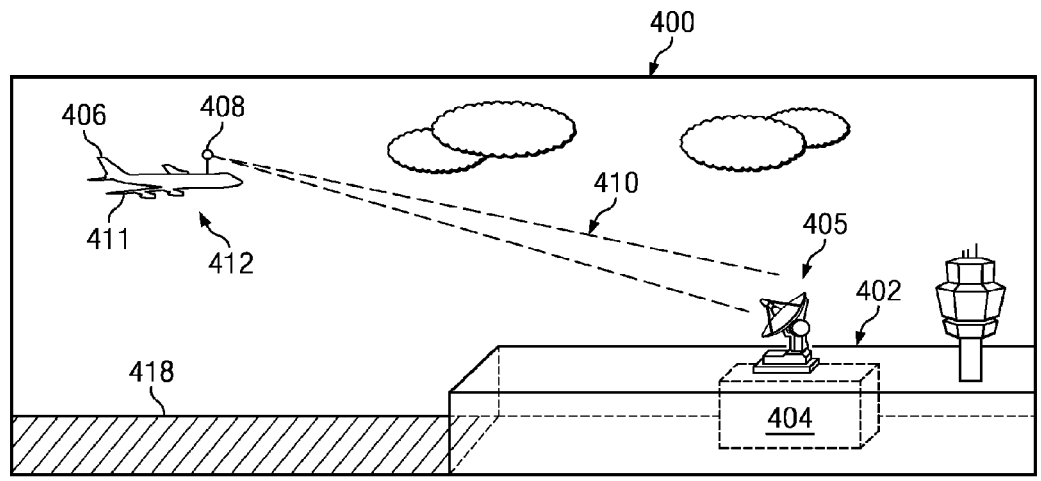
FIG. 4 is an illustration of communications between an aircraft and a ground station in accordance with an advantageous embodiment.

With reference now to FIG. 4, an illustration of communications between an aircraft and a ground station is depicted in accordance with an advantageous embodiment. In this illustrative example, communications environment 400 is another example of an implementation of communications environment 100 in FIG. 1. In these examples, communications environment 400 comprises aircraft 406 and airport 402 with ground station 404.

In this illustrative example, aircraft 406 approaches airport 402. During flight, aircraft 406 monitors the location of aircraft 406 to determine when aircraft 406 is at a selected distance from antenna 405 of ground station 404. This selected distance may be within a range of antenna 405 or some other distance away from the range of antenna 405.

Upon reaching this selected distance, aircraft 406 configures antenna 408 of aircraft 406 using an optimization process, such as optimization process 162. The optimization process is executed on aircraft 406 to position antenna 408 of aircraft 406 towards a direction for communicating with antenna 405. Aircraft 406 also tunes antenna 408 to a frequency within a range of frequencies for antenna 405. Thereafter, aircraft 406 sends wireless signals 410 towards antenna 405.

Ground station 404 may scan for wireless signals using antenna 405. Upon identifying wireless signals 410, ground station 404 may validate wireless signals 410. The validation is performed in these examples by identifying a number of unique identifiers for aircraft 406. These unique identifies may be, for example, tail numbers, security codes, airspeed, a range of frequencies for aircraft 406, a landing phase of flight, and/or other suitable information.

In these examples, the landing phase of flight may be, for example, the deployment of landing gear of aircraft 406, a configuration of the flaps on wings 411 of aircraft 406, and/or some other suitable configuration for landing for aircraft 406. Ground station 404 detects a landing phase of flight for aircraft 406 at location 412. Based on location 412 of aircraft 406, optimization process 162 is executed to configure antenna 405 at ground station 404. In these examples, antenna 405 is a directional antenna. Antenna 405 may be positioned by electrically and/or mechanically steering antenna 405 towards location 412 of aircraft 406. In other advantageous embodiments, antenna 405 may be an omnidirectional antenna that does not require steering.

During the landing phase of flight and upon validation of wireless signals 410 by ground station 404, aircraft 406 may initiate communications with ground station 404. Aircraft 406 uses antenna 408 of aircraft 406 to establish a wireless communications link with antenna 405 of ground station 404. In this manner, aircraft 406 uses antenna 408 to transmit and/or receive information to and from antenna 405 of ground station 404 in airport 402.

For example, aircraft 406 uses antenna 408 to transmit information in the form of wireless signals 410 to antenna 405 at ground station 404. This information may include, for example, without limitation, percentage of fuel remaining, flight path information, equipment maintenance information, crew status information, and/or other suitable information. Aircraft 406 may be in communications with ground station 404 before reaching ground 418 of airport 402.

In other advantageous embodiments, a communications service may be involved in establishing communications between aircraft 406 and ground station 404. A communications service such as, for example, without limitation, Aeronautical Radio, Incorporated (ARINC), may monitor requests for communications. This communications service may be accessible using optimization process 162 in FIG. 1.

In one illustrative example, the communications service monitors for a request from aircraft 406 to establish communications with ground station 404 prior to aircraft 406 reaching within a range of antenna 405. In response to detecting the request, the communications service sends a message or other notification of the request for communications to ground station 404.

Ground station 404 uses optimization process 162 to configure antenna 405 to prepare for establishing communications with aircraft 406. Further, aircraft 406 may use optimization process 162 to configure antenna 408 to prepare for establishing communications with ground station 404. In this manner, antenna 405 and antenna 408 may be configured for communications prior to aircraft 406 reaching within the range of antenna 405. This preparation increases the time available for aircraft 406 to send information in the form of wireless signals 410.

Figure 5:
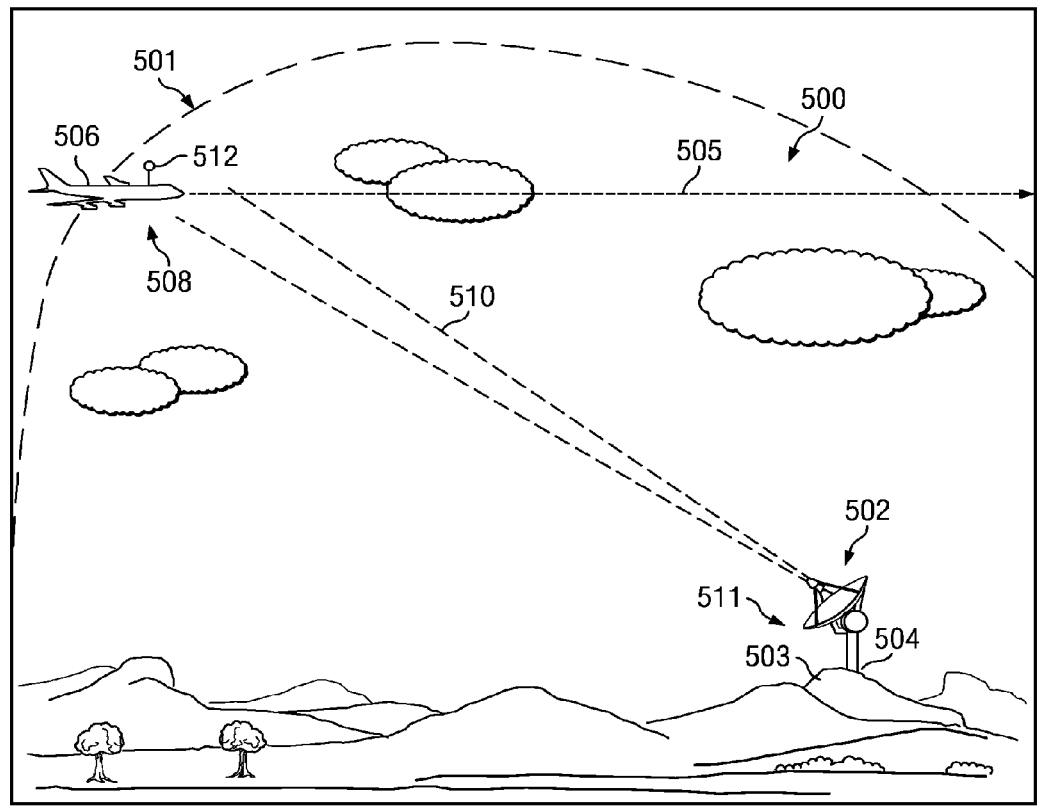
FIG. 5 is an illustration of a wireless communications area in accordance with an advantageous embodiment.

With reference now to FIG. 5, an illustration of a wireless communications area is depicted in accordance with an advantageous embodiment. In this illustrative example, wireless communications area 500 is one example of one implementation for communications environment 100 in FIG. 1. Wireless communications area 500 is an area that provides wireless communications within range 501 of wireless communications area 500.

Wireless communications area 500 is associated with antenna system 502 in this depicted example. Antenna system 502 includes antenna 511 and may be a directional antenna.

In these examples, location 504 for antenna system 502 may be a location along flight path 505 for aircraft 506. In the depicted example, antenna system 502 is at location 504 on top of mountain 503. In other illustrative examples, location 504 may be some other suitable location, such as a location at sea, near a city, or in some other suitable location.

Aircraft 506 may know location 504 of antenna system 502. For example, aircraft 506 may have a computer system that accesses a database. This database may include information about antenna system 502. This information may include, for example, location, frequency, and/or other suitable information for antenna system 502.

During flight, aircraft 506 monitors location 508 of aircraft 506. As one example, aircraft 506 may monitor location 508 using a global positioning system. While monitoring location 508, aircraft 506 determines whether location 508 is within range 501 of wireless communications area 500.

Once within range 501, aircraft 506 initiates a communications link with antenna system 502 using optimization process 162 in FIG. 1. Antenna system 502 is configured by optimization process 162 using location 504 and location 508 of aircraft 506 in these examples.

Aircraft 506 then transmits information in the form of wireless signals 510 to antenna system 502. In other examples, aircraft 506 also may receive information from antenna system 502. This information may include, for example, without limitation, weather information, flight path information, equipment updates, software updates, and/or other suitable information.

In other advantageous embodiments, optimization process 162 receives information that includes location 508 of aircraft 506. Using location 508 of aircraft 506, optimization process 162 configures antenna 511.

Antenna 511 may be configured by at least one of electrically and/or mechanically steering antenna 511 towards location 508 of aircraft 506, tuning antenna 511 to a frequency of aircraft 506, increasing bandwidth, increasing throughput, and/or configuring antenna 511 in some other suitable manner. In other advantageous embodiments, antenna 511 may be an omnidirectional antenna that does not require steering.

Aircraft 506 may periodically monitor for a frequency of antenna system 502 as aircraft 506 approaches range 501. For example, aircraft 506 may monitor for frequencies periodically. The period of time may be every minute, every second, or at some other time interval. Further, aircraft 506 may monitor for frequencies continuously or based on the occurrence of an event. When aircraft 506 detects the frequency of antenna system 502, aircraft 506 requests communications with antenna system 502. In response to this request, antenna system 502 uses optimization process 162 to configure antenna system 502 to provide communications in the form of wireless signals 510 between antenna system 502 and antenna 512 of aircraft 506.

Figure 6:
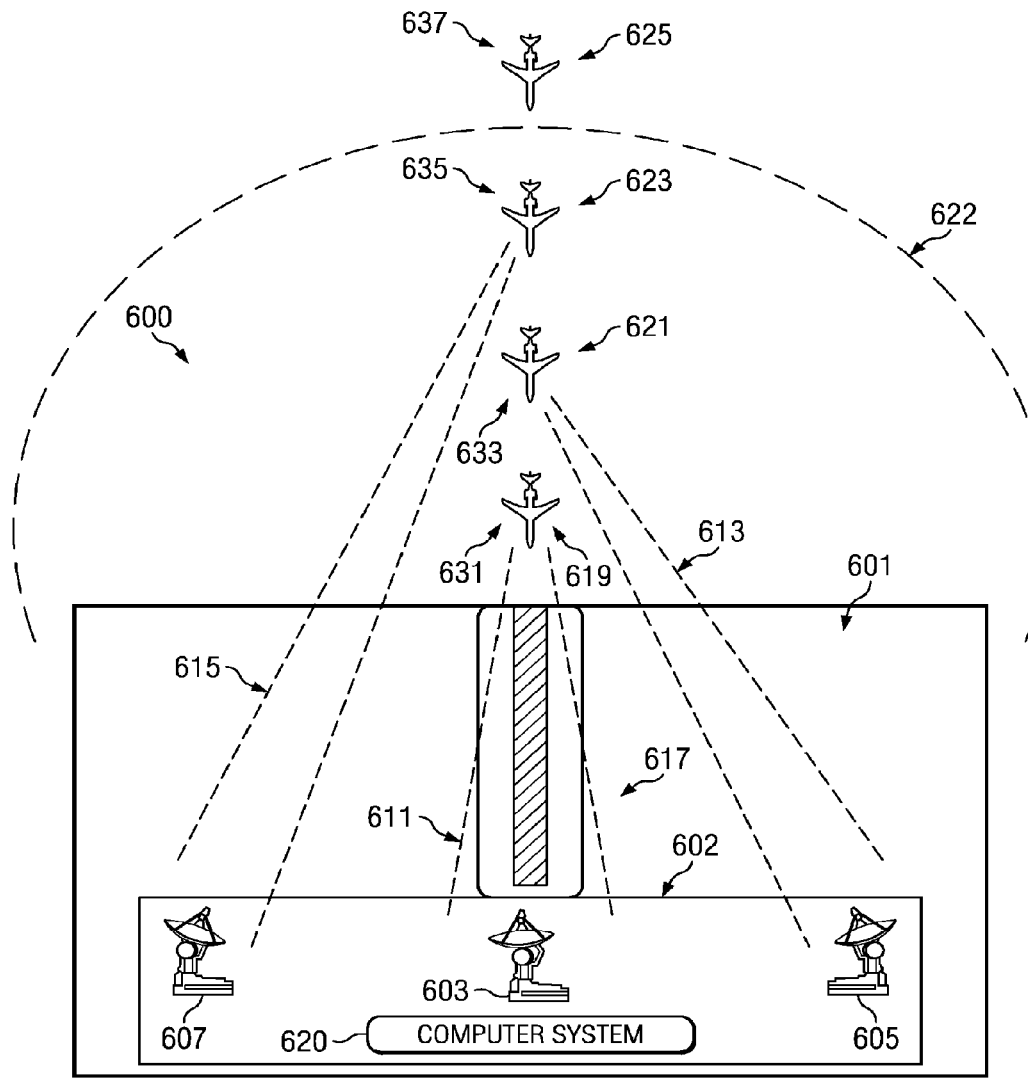
FIG. 6 is an illustration of wireless communications at an airport in accordance with an advantageous embodiment.

With reference now to FIG. 6, an illustration of wireless communications at an airport is depicted in accordance with an advantageous embodiment. In this illustrative example, wireless communication area 600 is an example of one implementation of communications environment 100 in FIG. 1. Wireless communications area 600 is an area that provides wireless communications at, for example, without limitation, airport 601. Wireless communication area 600 is associated with antenna system 602. In this depicted example, wireless communication area 600 is associated with antenna 603, antenna 605, and antenna 607 in antenna system 602. These antennas may be at a first number of locations.

In this illustrative example, aircraft 619, aircraft 621, aircraft 623, and aircraft 625 have information and/or may access information about antenna system 602. For example, without limitation, aircraft 619, aircraft 621, aircraft 623 and aircraft 625 have databases accessible by a computer system within each aircraft. These databases may include information about antenna system 602. This information may include, for example, without limitation, frequency information, locations of the multiple antennae within antenna system 602, and/or other suitable information for antenna system 602.

As depicted, antenna system 602 is associated with computer system 620. In these examples, computer system 620 may be at a location remote to antenna system 602. For example, computer system 620 may be located at a ground station or an air traffic control tower at airport 601.

In other advantageous embodiments, computer system 620 may be a number of computers in communications with each other. For example, each of the number of computers may be associated with a different antenna within antenna system 602. Further, these computers may be associated with each other by being connected by wires, wirelessly linked, and/or associated in some other suitable manner. Computer system 620 may include a number of computers, a data processing unit, and/or some other suitable component.

During flight of aircraft 619, aircraft 621, aircraft 623, and aircraft 625, antenna system 602 monitors a second number of locations for these aircraft. Antenna system 602 monitors location 631 of aircraft 619, location 633 of aircraft 621, location 635 of aircraft 623, and location 637 of aircraft 625 using computer system 620.

In one illustrative example, antenna system 602 monitors location 631, location 633, location 635, and location 637 using a global positioning system. This global positioning system may be associated with computer system 620.

In this illustrative example, aircraft 619, aircraft 621, aircraft 623, and aircraft 625 have airport approach paths. As each of these aircraft approach airport 601, the aircraft monitor for when the locations of the aircraft are within range 622 of wireless communication area 600.

As depicted, location 631 of aircraft 619, location 633 of aircraft 621, and location 635 of aircraft 623 are within range 622 of wireless communication area 600. Aircraft 619, aircraft 621, and aircraft 623 may send wireless signals 611, wireless signals 613, and wireless signals 615 to antenna 603, antenna 605, and antenna 607, respectively.

These antennas are positioned to ensure line-of-sight between the antennas and approaching aircraft. In other words, antenna 603, antenna 605, and antenna 607 are positioned to ensure line-of-sight with aircraft 619, aircraft 621, and aircraft 623 in these examples. Antenna 603, antenna 605, and antenna 607 may be positioned based on the predetermined airport approach paths for aircraft landing at airport 601.

Upon receiving these wireless signals, computer system 620 validates the wireless signals. Computer system 620 may validate these wireless signals by identifying a number of unique identifiers for the aircraft. These identifiers may include, for example, without limitation, tail number, flight plan, landing profile, security codes, and/or other suitable unique identifiers.

Once computer system 620 validates wireless signals 611, wireless signals 613, and wireless signals 615, computer system 620 may configure antenna system 602 to send updated information about antenna system 602 to the aircraft. For example, antenna 603 in antenna system 602 may be configured to form a configured antenna. In one illustrative example, computer system 620 may use an optimization process, such as optimization process 162, to provide load balancing. Further, computer system 620 may send information about the range of frequencies to be used for the individual antennae within antenna system 602.

Upon receiving this updated information about antenna system 602, aircraft 619, aircraft 621, and aircraft 623 establish communications with antenna system 602 to send information in the form of wireless signals to antenna system 602. The aircraft may send information such as, for example, without limitation, alerts, messages, fuel level, maintenance reports, crew status, and/or other suitable information.

Figure 7:
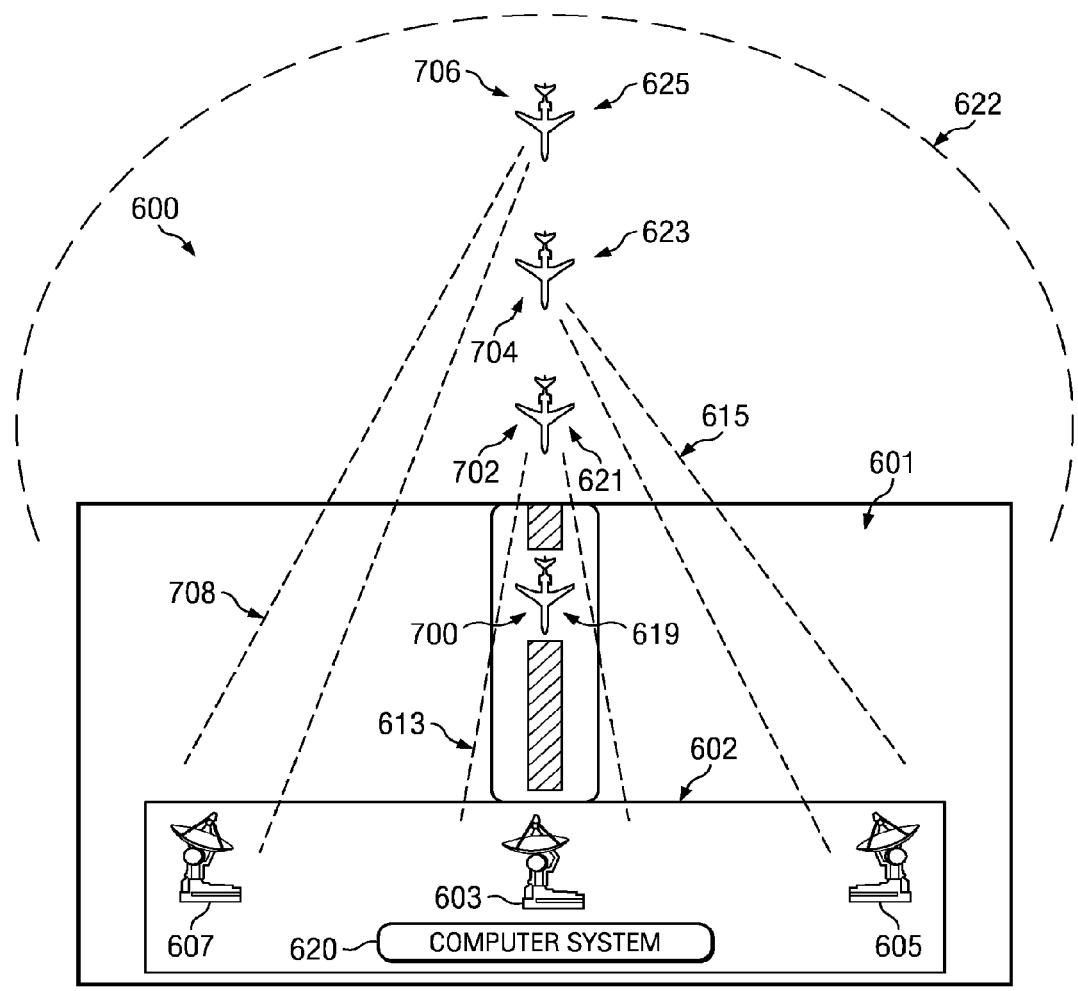
FIG. 7 is an illustration of wireless communications at an airport in accordance with an advantageous embodiment.

Turning now to FIG. 7, an illustration of wireless communications at an airport is depicted in accordance with an advantageous embodiment. As depicted in this illustrative example, the second number of locations for aircraft 619, aircraft 621, aircraft 623, and aircraft 625 have changed from FIG. 6. These aircraft are at a new second number of locations for the aircraft. In this example, aircraft 619 has landed on the ground at airport 601.

Computer system 620 continuously monitors the locations of aircraft 619, aircraft 621, and aircraft 623 during communications between these aircraft and antenna system 602. For example, when location 631 of aircraft 619 changes to on ground location 700, communications cease between aircraft 619 and antenna 603. This ceasing of communications allows a different form of communications between aircraft 619 and airport 601. Computer system 620 uses optimization process 162 in FIG. 1 to manage antenna system 602 after antenna 603 ceases receiving wireless signals 611 from aircraft 619.

In this illustrative example, optimization process 162 is used to monitor bandwidth and throughput for antenna system 602. The absence of wireless signals 611 from aircraft 619 may cause a reduction in at least one of the total bandwidth and total throughput for antenna system 602 below a desired level. Optimization process 162 detects this reduction. Based on this detection and the new second number of locations for the aircraft, computer system 620 reconfigures antenna 603, antenna 605, and antenna 607 in antenna system 602. The reconfiguration is performed to increase at least one of the total bandwidth and total throughput for antenna system 602.

This reconfiguration may involve repositioning of the antennas and/or changes in the frequencies for the antennas. The antennae may be repositioned by electrically and/or mechanically steering the antennae.

Aircraft 621 has moved to location 702. Aircraft 623 has moved to location 704. In this illustrative example, antenna 603 is reconfigured to receive wireless signals 613 from aircraft 621. Antenna 605 is reconfigured to receive wireless signals 615 from aircraft 623.

As depicted, aircraft 625 has moved to location 706. Location 706 of aircraft 625 puts aircraft 625 within range 622 of antenna system 602. In response to a request for communications between aircraft 625 and antenna system 602 within range 622 of antenna system 602, communications may be established between aircraft 625 and antenna system 602. Aircraft 625 sends information in the form of wireless signals 708 to antenna 607. In this manner, optimization process 162 and computer system 620 manage communications between antenna system 602 at airport 601 and aircraft approaching for landing at airport 601.

Figure 8:
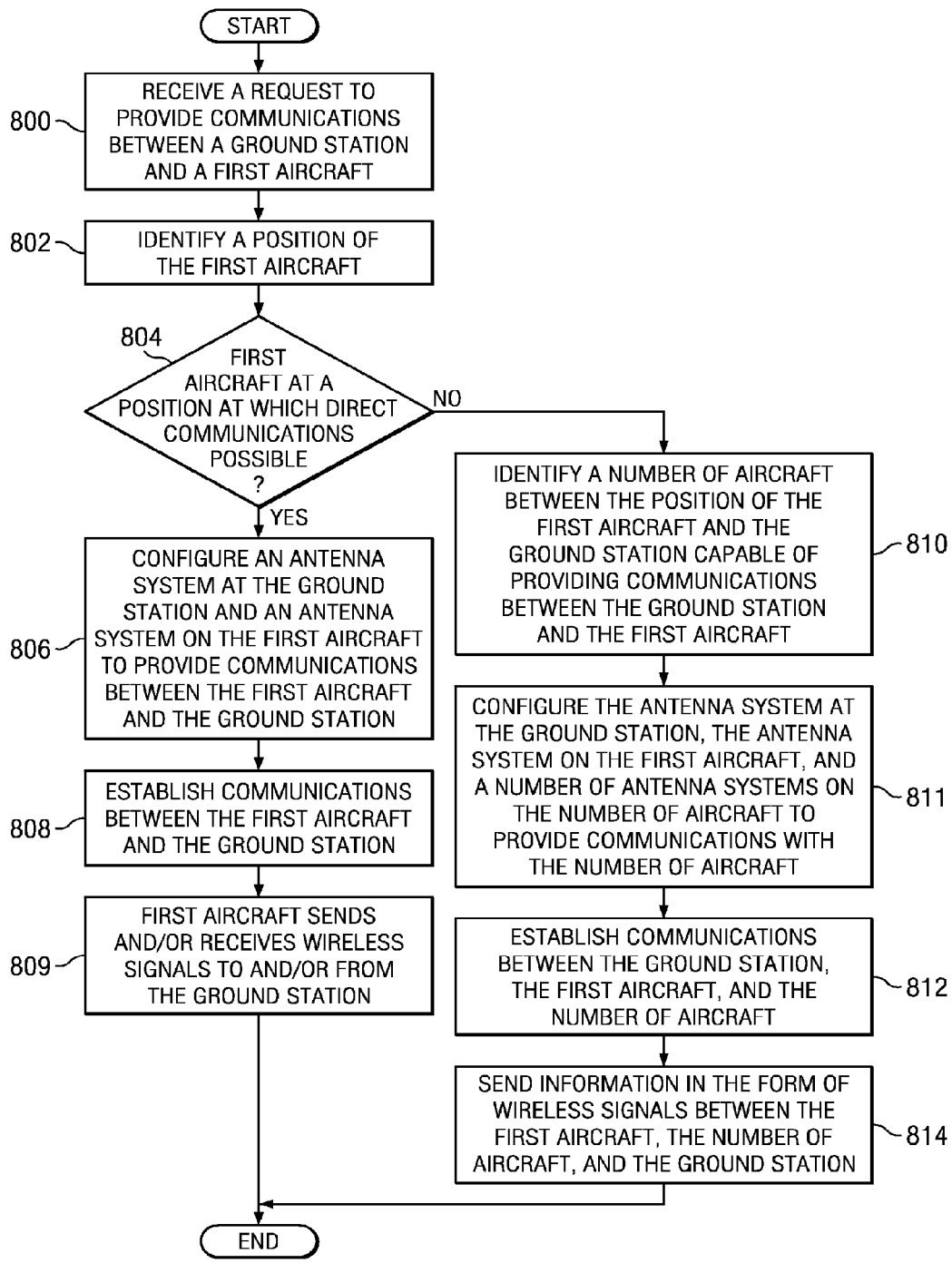
FIG. 8 is a flowchart of a process for establishing communications between a ground station and a number of aircraft in accordance with an advantageous embodiment.

With reference now to FIG. 8, a flowchart of a process for establishing communications between a ground station and a number of aircraft is depicted in accordance with an advantageous embodiment. The process illustrated in FIG. 8 may be implemented within a communications environment such as, for example, communications environment 100 in FIG. 1.

The process begins by receiving a request to exchange information between a ground station and a first aircraft (operation 800). The process then identifies a location of the first aircraft (operation 802). The location of the first aircraft may be identified using a system such as, for example, a global positioning system and/or some other system for identifying locations. In some examples, the first aircraft may be an aircraft within a plurality of aircraft approaching the ground station and may have a selected phase of flight.

Thereafter, the process determines whether the first aircraft is at a location at which direct communications are possible (operation 804). Direct communications are possible when the ground station and the first aircraft may communicate to exchange information without the use of another aircraft, another ground station, and/or some other suitable device. Direct communications may not be possible if the first aircraft is out of the line of sight from the ground station or is at a distance out of the range of communications by wireless signals. If the first aircraft is capable of direct communications with the ground station, the process then configures an antenna system at the ground station and an antenna system on the first aircraft to exchange the information between the first aircraft and the ground station (operation 806).

The process then establishes communications between the first aircraft and the ground station (operation 808). The first aircraft then sends microwave signals between the ground station and the first aircraft (operation 809), with the process terminating thereafter. These microwave signals provide communications for exchanging the information between the ground station and the first aircraft.

With reference again to operation 804, if direct communications between the ground station and the first aircraft are not possible, the process identifies a number of aircraft between the location of the first aircraft and the ground station capable of exchanging the information between the ground station and the first aircraft (operation 810). The process configures the antenna system at the ground station, the antenna system on the first aircraft, and a number of antenna systems on the number of aircraft to exchange the information between the number of aircraft, the ground station, and the first aircraft (operation 811). The process establishes communications between the number of aircraft, the first aircraft, and the ground station (operation 812).

Thereafter, the process exchanges the information in the form of microwave signals between the first aircraft, the number of aircraft, and the ground station (operation 814). For example, the process may send the information in the form of microwave signals from the ground station to a second aircraft within the number of aircraft.

The second aircraft may then send this information to a third aircraft in the form of microwave signals. The third aircraft, in turn, may send this information to the first aircraft in the form of microwave signals. In this manner, indirect communications between the ground station and the first aircraft may be provided. The process then terminates.

Figure 9:
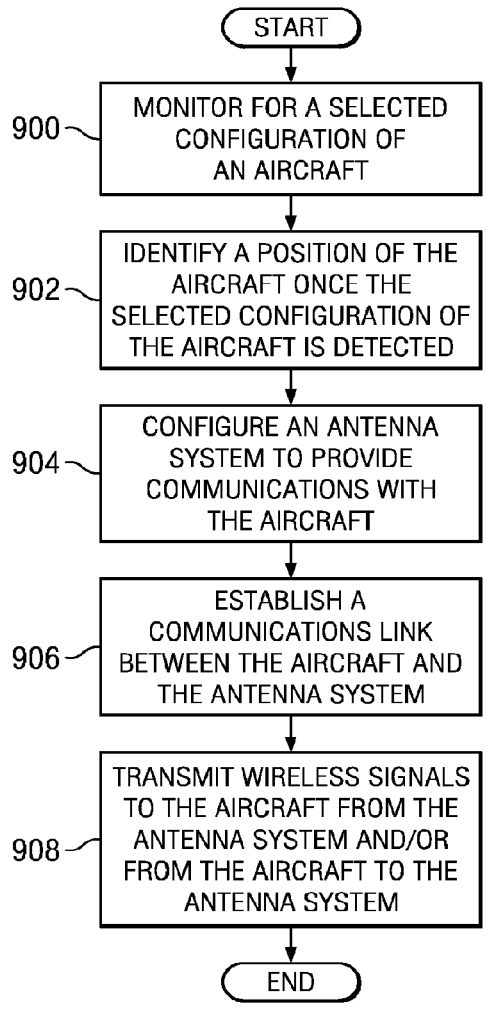
FIG. 9 is a flowchart of a process for establishing communications based on a selected phase of flight in accordance with an advantageous embodiment.

With reference now to FIG. 9, a flowchart of a process for establishing communications based on a selected phase of flight is depicted in accordance with an advantageous embodiment. The process illustrated in FIG. 9 may be implemented in a communications environment such as, for example, communications environment 100 in FIG. 1.

The process begins by monitoring for a selected configuration of an aircraft (operation 900). For example, an aircraft may monitor for a configuration of the landing gear of the aircraft, the flaps of an aircraft, and/or some other configuration. The selected configuration may be a configuration that identifies or is used during a phase of flight. As one example, a configuration with the landing gear of an aircraft deployed may indicate a landing phase of flight. As another example, a configuration with the flaps of the wings of an aircraft deployed also may indicate a landing phase of flight.

The process then identifies a location of the aircraft once the selected configuration of the aircraft is detected (operation 902). Thereafter, the process configures an antenna system to provide communications with the aircraft (operation 904). The antenna system may be configured by positioning an antenna within the antenna system, tuning the antenna to a frequency, and/or configuring the antenna in some other manner using an optimization process. The process then establishes a communications link between the aircraft and the antenna system (operation 906). Thereafter, the process transmits wireless signals to the aircraft from the antenna system and/or from the aircraft to the antenna system (operation 908), with the process terminating thereafter.

Figure 10:
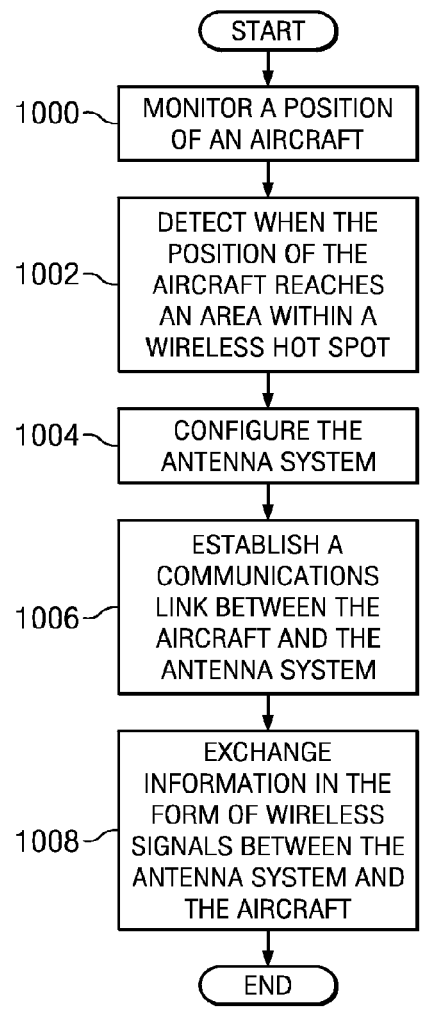
FIG. 10 is a flowchart of a process for establishing communications within a wireless hot spot in accordance with an advantageous embodiment.

With reference now to FIG. 10, a flowchart of a process for establishing communications within a wireless hot spot is depicted in accordance with an advantageous embodiment. The process illustrated in FIG. 10 may be implemented within a wireless communications area such as, for example, wireless communications area 400 in FIG. 4.

The process begins by monitoring a location of an aircraft (operation 1000). The process then detects when the location of the aircraft reaches an area within a wireless hot spot (operation 1002). For example, a wireless hot spot may have an antenna system at a location along a flight path for the aircraft. The wireless hot spot may be an area within some range or distance from the antenna system.

Thereafter, the process configures the antenna system (operation 1004). The antenna system may be configured by steering an antenna within the antenna system. The antenna may be steered electrically, mechanically, or in some other manner. The process establishes a communications link between the aircraft and the antenna system (operation 1006). The process then exchanges information in the form of wireless signals between the aircraft and the antenna system (operation 1008), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for providing communications between a source and an aircraft. Further, the different advantageous embodiments provide communications using an optimization process. The optimization process uses at least one of a maximum bandwidth, a maximum throughput, a least number of aircraft sending the wireless signals for communications between the source and the aircraft, a minimum distance between the source, the aircraft and/or the number of aircraft, and/or other suitable information to provide communications between the aircraft and the source.

Further, the different advantageous embodiments take into account and recognize that direct communications may not be possible over distances out of the range of antenna systems or when the aircraft is out of the line-of-sight of the antenna system for the source. The different advantageous embodiments provide a method for providing communications using a number of aircraft that are identified and configured to form a network for providing communications between the source and the aircraft. The network may be continuously reconfigured using an optimization process to increase bandwidth and increase throughput.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for exchanging information between a source and an aircraft, the method comprising:
   responsive to a request to exchange the information between the aircraft and the source, identifying a number of aircraft to send microwave signals between the source and the aircraft to form a number of identified aircraft based on a location of the aircraft and a location of the source;
   configuring the number of identified aircraft to send the microwave signals between the source and the aircraft to form a number of configured aircraft, wherein the number of configured aircraft form a mobile network; and
   sending the microwave signals between the source and the aircraft using the mobile network, wherein the information is exchanged between the aircraft and the source using the microwave signals sent through the mobile network.

2. The method of claim 1, wherein the request is received during a phase of flight of the aircraft and the phase of flight is selected from one of in flight, on ground, take off, landing, climbing, and cruising.

3. The method of claim 1, wherein the identifying step comprises:
   identifying the number of aircraft from a plurality of aircraft based on the location of the aircraft relative to the plurality of aircraft.

4. The method of claim 3 further comprising:
   identifying an updated number of aircraft from the plurality of aircraft to send the microwave signals between the source and the aircraft to form an updated number of identified aircraft based on an updated location of the aircraft and an updated location of the source;
   configuring the updated number of identified aircraft to send the microwave signals between the source and the aircraft to form an updated number of configured aircraft, wherein the updated number of configured aircraft form a modified mobile network; and
   sending the microwave signals between the source and the aircraft using the modified mobile network.

5. The method of claim 4 further comprising:
   identifying at least one of the number of aircraft and the updated number of aircraft using an optimization process, wherein the optimization process uses at least one of a maximum bandwidth, a maximum throughput, a least number of aircraft sending the microwave signals, a minimum distance between the number of aircraft, a minimum distance between the number of aircraft and the aircraft, a minimum distance between the source and the aircraft, and information about the aircraft and the number of aircraft.

6. The method of claim 5, wherein the information includes at least one of a location, a speed, a heading, a time, an altitude, a flight path, a phase of flight, and a range of frequencies.

7. The method of claim 1, wherein a first configured aircraft in the number of configured aircraft configures an antenna associated with the first configured aircraft to send the microwave signals between a second configured aircraft in the number of configured aircraft and the first configured aircraft.

8. The method of claim 1, wherein the source is selected from one of another aircraft and a ground station.

9. The method of claim 6 further comprising:
   configuring a first number of antennas using the optimization process to send the microwave signals between the source, the aircraft, and the number of identified aircraft; and
   configuring a second number of antennas using the optimization process to send the microwave signals between the source, the aircraft, and the updated number of identified aircraft.

10. The method of claim 9, wherein the configuring step comprises:
    positioning the first number of antennas and the second number of antennas; and
    tuning the first number of antennas and the second number of antennas to a number of frequencies.

11. The method of claim 1, wherein the source is a ground station and the configuring step comprises:
    positioning a directional antenna on the ground station.

12. A method for providing communications, the method comprising:
    responsive to a request to provide the communications between a source and an aircraft within a plurality of aircraft approaching the source and having a selected phase of flight, identifying an antenna in a plurality of antennas associated with the source based on a location of the aircraft and a location of the antenna;

configuring the antenna to send microwave signals between the source and the aircraft to form a configured antenna; and sending the microwave signals between the source and the aircraft using the configured antenna, wherein the microwave signals provide the communications.

13. The method of claim 12 further comprising:

configuring a number of antennas in the plurality of antennas to send the microwave signals between the source and a number of aircraft in the plurality of aircraft based on a first number of locations for the number of antennas and a second number of locations for the number of aircraft to form a number of configured antennas.

14. The method of claim 13, wherein the number of configured antennas sends the microwave signals between the source and the number of aircraft with a total bandwidth and a total throughput for the communications.

15. The method of claim 14, ground when the at least one wherein the aircraft is on of the total bandwidth and the total throughput are reduced below a desired level.

16. The method of claim 14 further comprising:

responsive to the reduction of the at least one of the total bandwidth and the total throughput for the communications below the desired level, identifying a new second number of locations for the aircraft to increase the at least one of the total bandwidth and the total throughput for the communications;

reconfiguring the number of antennas to send the microwave signals between the source and the number of aircraft based on the first number of locations for the number of antennas and the new second number of locations for the number of aircraft; and responsive to reconfiguring the number of antennas, sending the microwave signals between the source and the number of aircraft using the number of antennas.

17. The method of claim 16, wherein the configuring and reconfiguring steps are performed using an optimization process, and wherein the optimization process uses at least one of a maximum bandwidth, a maximum throughput, a minimum distance between the number of aircraft and the number of antennas, and information about the number of aircraft.

18. The method of claim 16, wherein the configuring and reconfiguring steps comprise:

positioning the number of antennas; and tuning the number of antennas to a number of frequencies of the number of aircraft.

19. The method of claim 12, wherein the reconfiguring step comprises:

switching the configured antenna in a number of configured antennas from a first frequency for a first aircraft in a number of aircraft to a second frequency for a second aircraft in the number of aircraft.

20. An apparatus comprising:

an aircraft; and a number of directional antennas associated with the aircraft, wherein the number of directional antennas is capable of being configured to send microwave signals with a source using a number of identified aircraft that form a mobile network in response to a request to exchange information between the source and the aircraft, and wherein the number of identified aircraft in the mobile network are selected based on a location of the aircraft and a location of the source.

21. The apparatus of claim 20, wherein the number of identified aircraft are identified from a plurality of aircraft based on the location of the aircraft relative to the plurality of aircraft.

22. The apparatus of claim 21 further comprising:

an updated number of identified aircraft in the plurality of aircraft, wherein the updated number of identified aircraft form a modified mobile network and are used to send the microwave signals between the source and the aircraft at an updated location of the aircraft and an updated location of the source.

23. The apparatus of claim 20 further comprising:

the source; and a plurality of antennas associated with the source, wherein an antenna in the plurality of antennas is configured to exchange the microwave signals between the source and the aircraft to form a configured antenna.

24. The apparatus of claim 20 further comprising:

the source; and a plurality of antennas associated with the source, wherein a number of directional antennas in the plurality of antennas is configured to send the microwave signals between the source and a number of aircraft in the plurality of aircraft based on a first number of locations for the number of directional antennas and a second number of locations for the aircraft and a number of aircraft.

25. The apparatus of claim 24, wherein the number of antennas is capable of being reconfigured in response to a reduction of at least one of a total bandwidth and a total throughput for the communications below a desired level.

26. A method for exchanging information between a source and a first aircraft, the method comprising:

identifying a number of additional aircraft to send signals between the source and the first aircraft, wherein identifying is based on a location of the aircraft and a location of the source, wherein a number of identified aircraft is formed, and wherein the number of identified aircraft form a mobile network; and sending the signals between the source and the first aircraft using the mobile network, wherein the information is exchanged between the first aircraft and the source using the signals sent through the mobile network.

* * * * *

UNITED STATES PATENT AND TRADEMARK OFFICE
CERTIFICATE OF CORRECTION

PATENT NO. : 9,692,500 B2
APPLICATION NO. : 15/226044
DATED : June 27, 2017
INVENTOR(S) : Small et al.

Page 1 of 1

It is certified that error appears in the above-identified patent and that said Letters Patent is hereby corrected as shown below:

Column 17, Line 20, change "ground when the at least one wherein the aircraft is on of" to --wherein the aircraft is on ground when the at least one of--
Column 17, Line 50, change "reconfiguring" to --configuring--

Signed and Sealed this
Thirtieth Day of October, 2018

Andrei Iancu
*Director of the United States Patent and Trademark Office*